United States Patent
Paya et al.

[11] Patent Number: 5,921,722
[45] Date of Patent: Jul. 13, 1999

[54] POLYGONAL CUTTING INSERT

[75] Inventors: José Agustin Paya; Thomas Braun, both of Mühlheim, Germany

[73] Assignee: Widia GmbH, Essen, Germany

[21] Appl. No.: 08/836,174
[22] PCT Filed: Aug. 19, 1995
[86] PCT No.: PCT/DE95/01119
§ 371 Date: Jun. 6, 1997
§ 102(e) Date: Jun. 6, 1997
[87] PCT Pub. No.: WO96/11763
PCT Pub. Date: Apr. 25, 1996

[30] Foreign Application Priority Data

Oct. 17, 1994 [DE] Germany ............................ 4437093

[51] Int. Cl.⁶ ........................ B23D 15/28; B26D 1/00; B26D 3/00
[52] U.S. Cl. .................... 407/114; 407/113; 407/115; 407/116
[58] Field of Search ........................... 407/113, 114, 407/115, 116

[56] References Cited

U.S. PATENT DOCUMENTS

| | | |
|---|---|---|
| 4,674,924 | 6/1987 | Carlson et al. ............... 407/114 |
| 4,846,609 | 7/1989 | Bernadic et al. . |
| 4,992,008 | 2/1991 | Pano ............................ 407/116 |
| 5,460,464 | 10/1995 | Arai et al. ..................... 407/114 |
| 5,765,972 | 6/1998 | Ericksson et al. ............ 407/115 |

FOREIGN PATENT DOCUMENTS

| | | |
|---|---|---|
| 0 143 758 | 6/1985 | European Pat. Off. . |
| 0 492 631 A1 | 7/1992 | European Pat. Off. . |
| 0 066 091 | 12/1982 | France . |
| 0 278 083 | 8/1988 | Germany . |
| 42 39 236 A1 | 5/1994 | Germany . |
| 2 254 026 | 9/1992 | United Kingdom . |
| WO 93/11898 | 6/1993 | WIPO . |

Primary Examiner—Andrea L. Pitts
Assistant Examiner—Toan Le
Attorney, Agent, or Firm—Herbert Dubno

[57] ABSTRACT

A polygonal cutting insert with at least one rib-shaped raised elongated cutting component of the face arranged at a distance from the cutting edge and extending generally in the chip removal direction. The rib has a front end spaced inwardly of the cutting edge and a cross section increasing from the front end to a region at which the cross section is a maximum and then decreasing from that maximum to a rear end of the rib.

24 Claims, 10 Drawing Sheets

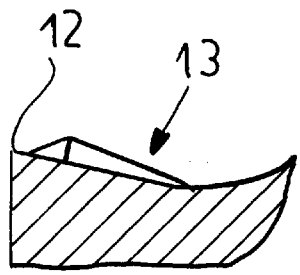 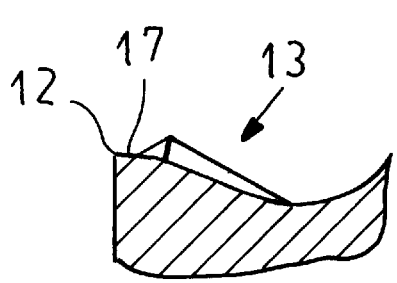 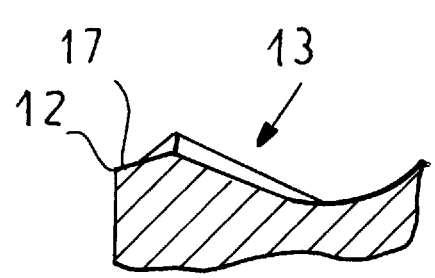
FIG.6a  FIG.6b  FIG.6c
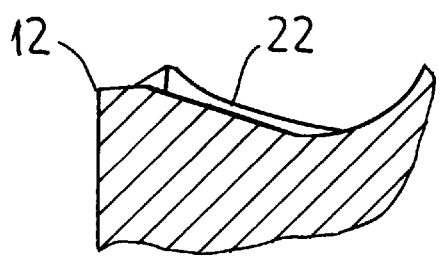
FIG.6d
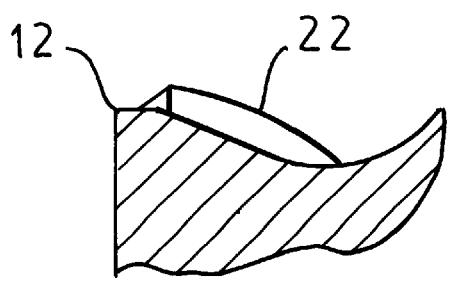
FIG.6e

POLYGONAL CUTTING INSERT

CROSS REFERENCE TO RELATED APPLICATION

This application is a national stage of PCT/DE 95/01119 filed Aug. 19, 1995 and based, in turn, on German National Application P 44 37 093.8 of Oct. 17, 1994 under the International Convention.

FIELD OF THE INVENTION

The invention relates to a polygonal cutting insert with at least one raised longitudinal rib-shaped cutting element arranged on the face of the insert at a distance from the cutting edge and extending longitudinally to define a longitudinal axis. The elongated cutting rib is arranged substantially in the chip removal direction, whereby the longitudinal rib section, seen in the direction of chip removal, has a maximum.

BACKGROUND OF THE INVENTION

Such a cutting insert is described for instance in DE 42 39 236 A1. The longitudinal ribs described therein have in there longitudinal section a minimum and a maximum in a region away from the cutting edge, or are at the same level as a central face plateau raised with respect to the cutting edges or corners. Seen in cross section, the longitudinal ribs can have a constant width over their entire longitudinal axis or can become wider towards a region located at a distance from the cutting edge. In the case of relatively large initial curvature radii of the removed chip, particularly when the cutting element is used with small advance, these ribs make it possible to bend up the chip as much as possible. In the case of high advance rates, due to the maximum or greatest height located at a distance from the cutting edge it is possible to act counteract a very small initial curvature radius, i.e. a very tight curling of the chip.

A cutting insert having longitudinal ribs with a parabolic cross section, arranged along the cutting edge at identical acute angles, is described in DE 41 18 070 A1. Cutting inserts with longitudinal ribs having at least one recess reaching up to the cutting face, are described in the WO 92/21467. Finally there are also known cutting inserts with raised cutting elements or a median raised face plateau which has nose-like or wedge-like projections pointing in the direction of the cutting corner or cutting edge.

OBJECTS OF THE INVENTION

It is an object of the present invention to provide a cutting insert suitable for turning, lancing, milling and like machining operations, particularly for steel and for materials with relatively difficult chip control, such as highly alloyed steel and titanium-aluminum alloys, whose face geometry forms the removed chip during cutting in the region immediately adjacent to the cutting edge, without allowing the removed chips to put undue strain on the cutting insert itself.

Another object of the invention is to provide an improved cutting insert which has wear-resistant ribs, capable of withstanding even the strong friction, resulting from roughing-down operations or due to the type of material machined.

SUMMARY OF THE INVENTION

These objects are achieved by a cutting insert wherein, according to the invention, a the longitudinal rib has a ascending slope or inclined flank facing the cutting edge and which widens towards a region spaced away from the cutting edge and reaches its greatest width in the region of the maximum cross section of the rib. The longitudinal rib has an upper surface or flank descending and narrowing from the region of the maximum to a region further away from the cutting edge and the region of the maximum projects above the cutting edge.

This cutting insert can insure that the chip is bent away from the face of the cutting insert immediately behind the cutting edge by the ascending slope, whereby the cutting insert is noticeably relieved after the chip slides away over the maximum of the longitudinal rib. The described longitudinal rib offers optimal chip guidance counteracts the lateral deflection of the chip. Besides the friction of the chip against the face is kept as low as possible.

The longitudinal rib can have longitudinal axis which is set at an angle between 30° and 150°, preferably between 60° and 120°, with respect to the cutting edge. The layout of the longitudinal rib or ribs, which preferably are parallel to each other, is essentially determined by the chip removal conditions and the chip flow.

In order to provide a noticeable relief from the friction with the removed chip at the descending upper surface, each of the lateral edges forming the junction of the descending upper surface with the adjacent lateral flanks of the longitudinal rib is inclined at an angle between 3° and 20°, preferably 5° to 15°, with respect to the longitudinal axis of the longitudinal rib, thereby forming the mentioned narrowing of the upper surface. The respective angles are measured in a plan view of the longitudinal rib. Preferably the bilateral edges, which laterally delimit the upper surface, are arranged symmetrically as mirror images with respect to the longitudinal axis, i.e. under absolutely equal angles, but with opposite inclinations to the longitudinal axis. Depending on the intended use, they can also be arranged asymmetrically.

The initial width of the ascending slope or front flank at the frontal base point of the longitudinal rib, which is the point closest to the cutting edge, ranges between 0 and 0.5 mm, preferably 0.2 to 0.3 mm. This width increases to a width which in the region of the maximum, ranging between 0.3 and 1.5 mm, preferably 2 to 4 times the initial width.

In order to insure that the chip is seized by the ascending slope almost immediately after its formation at the cutting edge, the distance of the longitudinal rib from the cutting edge is 0.03 mm to 1 mm, preferably 0.05 mm to 0.3 mm. The total length of the longitudinal rib which comprises the length of the ascending slope and of the descending upper surface ranges between 1.0 mm and 8 mm, preferably 1.5 mm to 4 mm, whereby the length of the ascending slope lies between 0.3 mm and 1.5 mm, preferably between 0.4 and 0.8 mm. The front flank thus is clearly shorter than the descending upper surface. The ascending slope is substantially flat and has an angle of ascent of between 10° and 45°, preferably 20° to 30° with respect to the face adjacent to the cutting edge. As an alternative it is also possible to shape the ascending slope concavely or convexly seen in the direction of the longitudinal axis, whereby the tangential surfaces in the median area of the ascending slope have angles of ascent of the aforementioned magnitude with respect to the face adjacent to the cutting edge. The maximum can be sharp-edged or convex seen in the direction of the longitudinal axis. If the region of the maximum is curved a radius between 0.1 mm and 1 mm, preferably between 0.25 mm and 0.5 mm, is preferred.

The descending and narrowing upper surface has in the direction of the longitudinal axis an angle of inclination between 5° and 40°, preferably 5° and 25°, with respect to the face bordering on the cutting edge. Preferably an inclination angle is selected which is equal to the effective cutting angle, i.e. the angle between the face and a theoretical perpendicular to the machining surface. The longitudinal ribs can have convex or concave upper surfaces.

As has already previously been mentioned, it is possible to arrange several longitudinal ribs in the region with an interspacing between two neighboring maxima which is 1.5 to 5 times, preferably 1.5 to 3 times greater than the width of the respective maxima (measured transversely to the longitudinal axis of the longitudinal rib).

The cutting insert has longitudinal ribs with lateral flanks bordering the ascending slope and/or the upper surface, which seen transversely to the longitudinal axis, can be concave, convex or essentially flat. Particularly in the area bordering the face surrounding the longitudinal rib or in the area of the ascending slope and/or at the upper surface edge roundings can be provided. The lateral flanks have inclination angles with respect to the face surrounding the longitudinal ribs or the cutting edge plane ranging between 15° and 45°, preferably between 20° and 35°. These inclination angles are defined by the connection line between the base point of the lateral flank on the face and the limit point to the ascending slope or the upper surface. Seen in transverse direction to the longitudinal axis, the ascending slope and/or the upper surface run parallel to the cutting edge or at a positive or negative angle up to 15°.

The surface of the insert adjacent the cutting edge can be provided with a chamfer adjacent to the cutting edge, which is at a positive or negative angle. Depending on the chamfer width, the ascending slope can reach into the region of the chamfer.

According to the invention, the maxima of the longitudinal ribs are always above the level of the cutting edge, in the working position of the cutting insert during machining, as well as in the flat position of the cutting insert. The height by which the maximum lies above the cutting edge at the intersection point between the extended longitudinal axis and the cutting edge ranges between 0.05 mm and 0.5 mm, preferably 0.1 mm and 0.3 mm.

According to a further embodiment of the invention, several longitudinal ribs can be arranged along the cutting edge, at various angles of inclination, of various size, shape and height within the above-described limits.

Preferably the cutting insert has a positive free flank. The cutting edge can be straight, convex, concave or sinuous.

According to a further embodiment of the invention, in addition to the described longitudinal ribs, further raised cutting elements or cutting recesses or cutting grooves or notches can be provided. In this respect reference is made particularly to DE 41 41 368 A1, DE 41 18 065 A1 and DE 41 36 417 A1. The basic shape of the cutting insert can be rhombic, square, triangular or round, whereby the cutting insert can be one-sided with cutting elements provided on a single side of the cutting surface or it can be a two-sided cutting insert with opposite faces with cutting elements. Optionally the cutting element to be used only on one side can be designed to have a protection chamfer against chip impact.

BRIEF DESCRIPTION OF THE DRAWING

The above and other objects, features, and advantages will become more readily apparent from the following description, reference being made to the accompanying drawing in which:

FIGS. 6a, 6b, 6c, 6d and 6e are further sectional views along line A—A of FIG. 1a showing various embodiments;

SPECIFIC DESCRIPTION

Figure 1A:
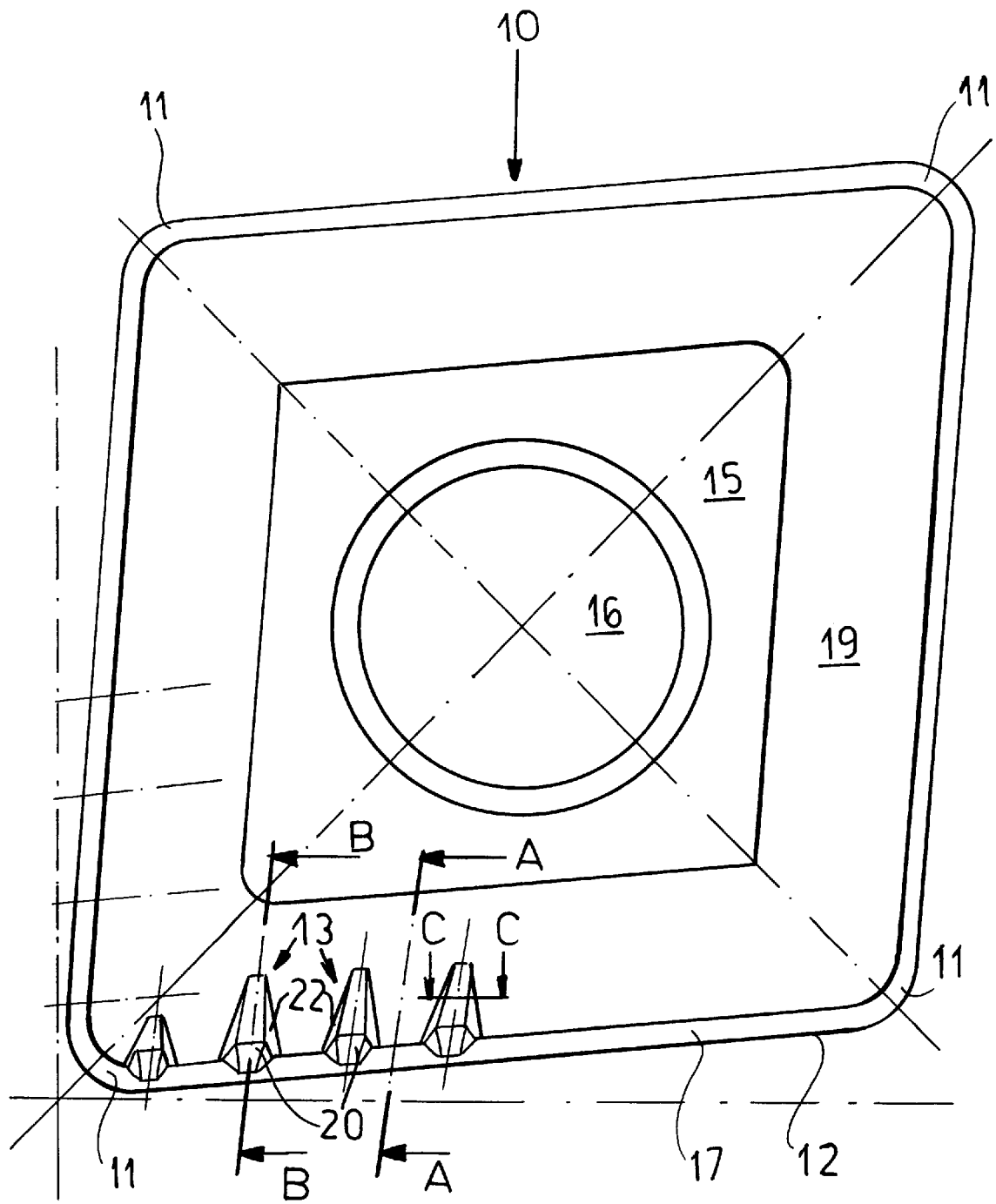
FIG. 1a is a top view of a rhombic cutting insert according to the present invention.

In FIG. 1a a top view of a rhombic cutting element 10 is shown, which has four cutting corners 11, each continued by the respective cutting edges 12. Along the cutting edge 12 which continue the cutting corner 11 used during cutting, several mutually parallel longitudinal ribs 13 can be seen, each having a longitudinal axis 14 set at identical angles. In the present case four longitudinal ribs 13 are illustrated, which are arranged in the region of the maximal cutting depth in the workpiece 32 (see FIG. 1b). The face segments adjacent to the other cutting corners along the respective cutting edges have corresponding longitudinal ribs (not shown). The number of the longitudinal ribs arranged on the face is not limited, but at least one longitudinal rib is provided.

As shown in FIG. 1a, the cutting insert can have a median face plateau 15 which is raised the cutting edge plane. Further the cutting insert has a central mounting hole 16 through which a tightening screw can pass. Alternately it is also possible to provide clamping projections, fastening depressions or the like fastening elements arranged as centrally as possible, which in conjunction with a correspondingly shaped clamping finger make it possible to securely fasten of the cutting insert to the tool holder.

The respective longitudinal ribs laid out along the cutting edge can vary in their shape, size, direction, number and combination with other cutting elements known to the state of the art, as will be explained for instance with reference to the cutting insert of FIG. 10.

The ribs should be uniformly oriented in the direction of the chip removal, i.e. the chip removal direction should determine the direction of the longitudinal axis 13 of the cutting elements. The longitudinal ribs 14 are relatively close to the cutting edge 12 with their frontal edge, so that they can act almost immediately on the removed chip after cutting. The highest rib points created by the maximum to be later explained are always located above the level of the cutting edge 12, in the position of use when the cutting insert is fixed in a tool holder and directed at the workpiece to be cut at a cutting angle determined by the nature of the material, as well as in a position wherein the cutting insert is laid on a flat horizontal plane.

The longitudinal ribs of the invention are uniform with an ascending slope or front flank 20 facing the cutting edge 12 and which widens towards a region spaced away from the cutting edge. The ascending slope ends in a maximum, followed by a descending upper surface 22 which narrows towards a region further remote from the cutting edge. The ascending slope and the upper surface are each defined by border lines, having lateral flanks on each side. Generally the ascending slope, seen in the direction of chip removal, has to be considerably shorter than the descending upper surface. The ascending slope, as well as the descending upper surface, are shaped like wedges, whereby the ascending slope has absolutely a greater angle of ascent then the inclination angle of the upper surface.

Figure 1B:
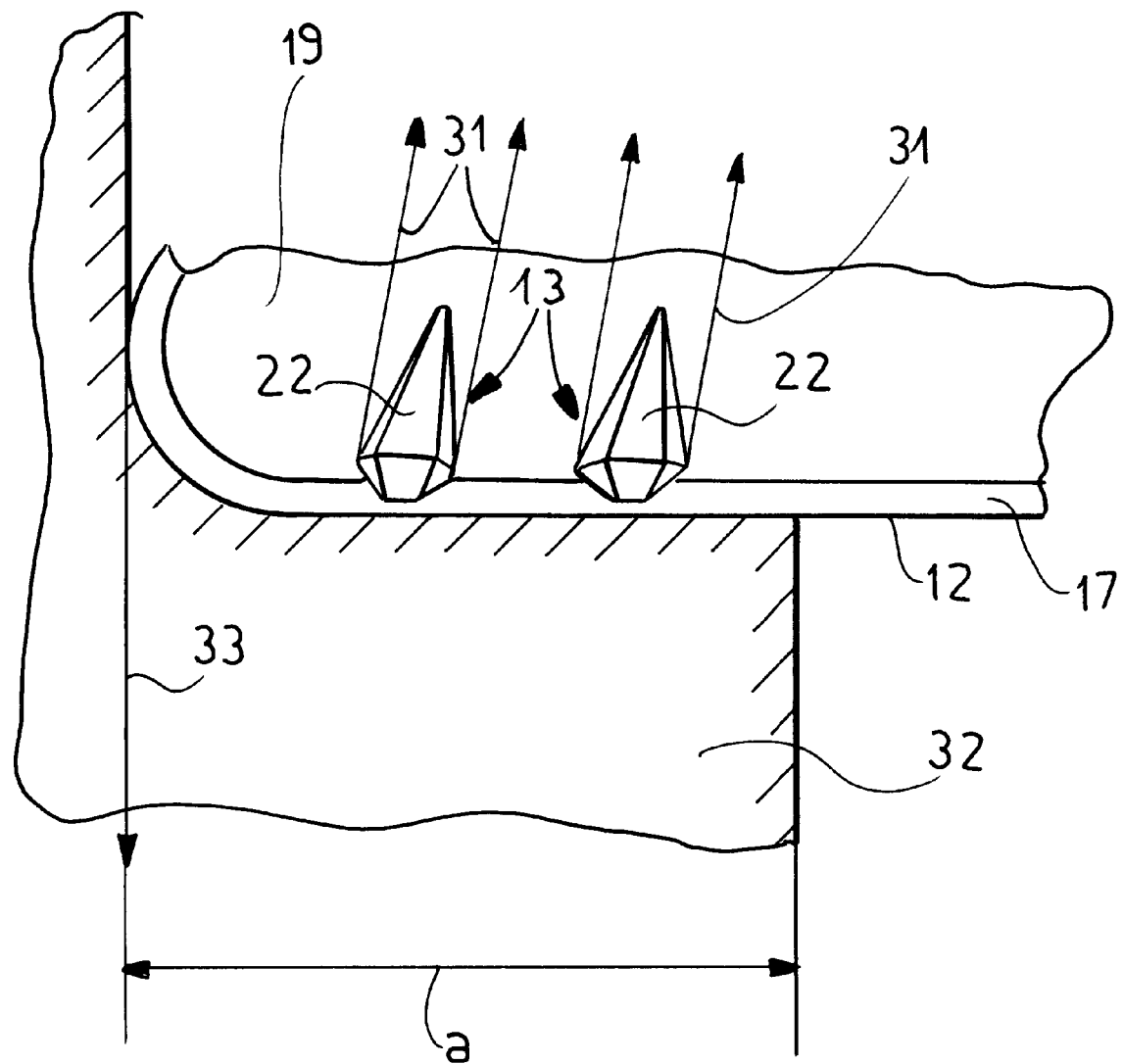
FIG. 1b is a fragmentary plan view of the cutting insert of FIG. 1 during workpiece machining.
Figure 2:
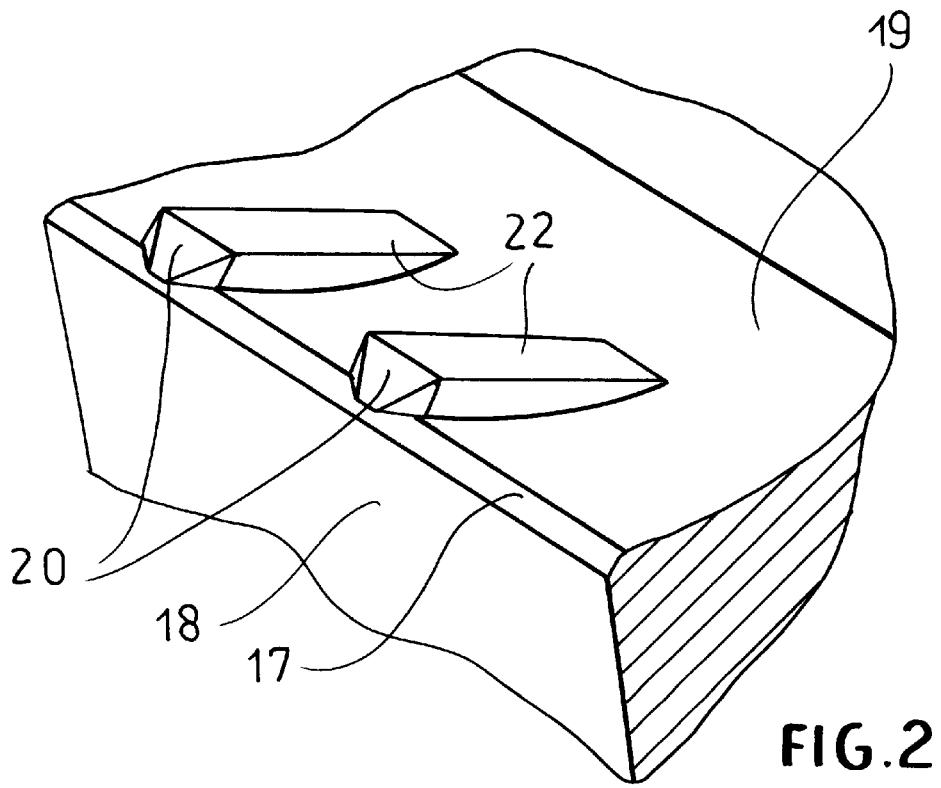
FIG. 2 is a perspective view of a portion of the cutting insert of the invention with a negative chamfer.
Figure 3:
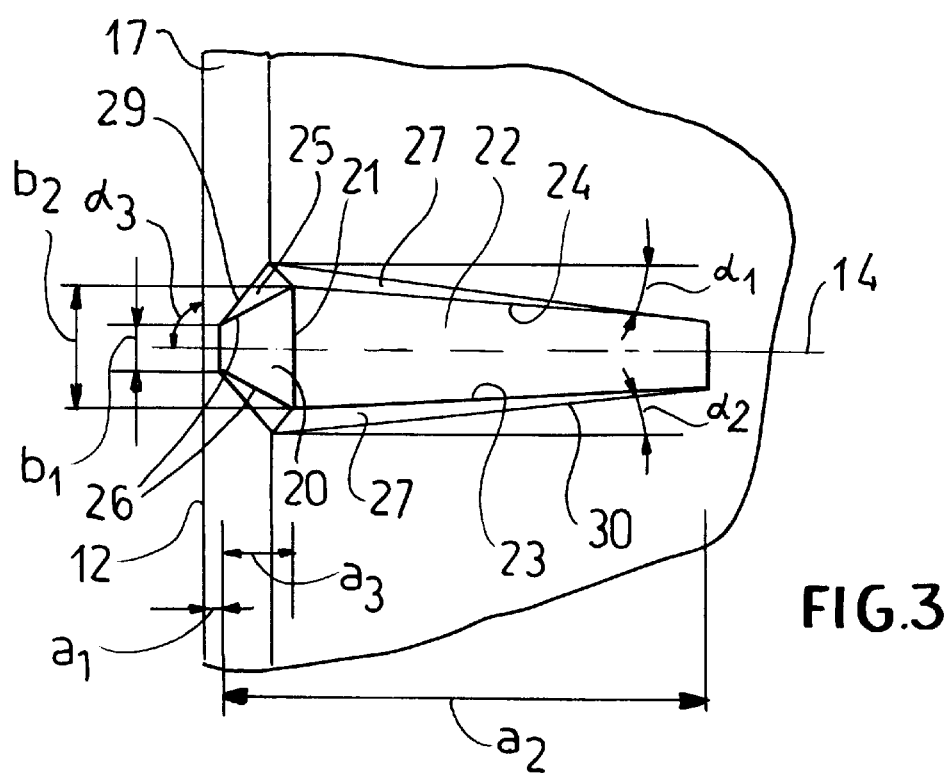
FIG. 3 is a fragmentary top view of a cutting insert showing the dimensions of a longitudinal rib.

As shown in FIGS. 1a, 1b and 2, a chamfer 17 adjoining the cutting edge 12 can be provided, which runs at a 0° angle or at a positive or negative angle. FIG. 2 shows an embodiment with a negative chamfer 17. Adjoining the cutting edge 12 is a free flank 18, which is arranged at a lead angle of 0° or a positive lead angle. The face 19 adjoining the cutting edge 12 or a chamfer 17 can be designed to descend towards the areas away from the cutting edge or shaped like a depression, as can be seen in the perspective view of FIG. 2. The longitudinal ribs 13 are essentially located in this depression, but the ascending slope 20 rises at least partially above a possible chamfer 17.

As can be seen especially from FIGS. 2 to 4a, 4b, the longitudinal ribs have a distance $a_1$ from the cutting edge 12, which equals at least 0.03 mm, preferably 0.05 mm to 0.3 mm. In its frontal region facing the cutting edge 12, the longitudinal rib 13 can start out with a point or with a width $b1$, i.e. the width $b_1$ shown in FIG. 3 equals 0 mm to 0.5 mm, preferably 0.2 mm to 0.3 mm. The ascending slope 20 widens continuously towards the cross-sectional area maximum of the rib from the cutting edge to a width $b_2$ which ranges between 0.3 mm and 1.5 mm, whereby in the case of a predetermined positive width $b_1$, the width b2 is 2 to 4 times greater than the width $b_1$. The ascending slope ends in an edge 21, which also represents the maximal height of the longitudinal rib. In the following this edge 21 is also referred to as the maximum 21. The surface 22 extends from edge 21 toward a region more remote from the cutting edge, the edge 21 running transversely with respect to the longitudinal axis 14 of the longitudinal rib 13. This descending upper surface 22 narrows rearwards. The narrowing is determined by the angles $\alpha_1$ and $\alpha_2$, which range between 3° and 20°, preferably 5° to 15°. These angles $\alpha_1$ and $\alpha_2$ are formed by the lateral edges 23 and 24 of the upper surface with respect to the direction of the longitudinal axis 14. The angles $\alpha_1$ and $\alpha_2$ can be equal or different, whereby the upper surface is mirror-image symmetrical or also asymmetrical with respect to the longitudinal axis. The total length $a_2$ of the longitudinal rib lies between 1 mm and 8 mm, preferably 1.5 mm to 4 mm. The length $a_3$ of the ascending slope 20 is between 0.3 mm and 1.5 mm, and the length of the upper surface 22 is clearly greater than the length $a_3$ of the ascending slope 20. For instance the value $a_2$–$a_3$ can be more than 5 times greater than $a_3$. On the sides of the ascending slope 20 the longitudinal rib has lateral flanks 25, each forming a common edge 26 with the ascending slope 20. The edge 26 forms with the longitudinal axis 14 an angle $\alpha_3$, which here has approximately 30°. This angle is determined by the respective width $b_1$ and $b_2$, as well as by the length $a_3$ of the ascending slope. The edges 23 and 24 are adjoined laterally by the lateral flanks 27, whose width according to the construction (see top view according to FIG. 3) decreases to 0 in the areas away from the cutting edge, since the upper surface has a more noticeable descent in the areas away from the cutting edge than the face surrounding the longitudinal ribs. In the present case the upper surface 22 merges into the face at 28. The angular setting of the lower edges 29 and 30 of the lateral flanks 25 and 27 is determined by the flank angles $\gamma_1$ and $\gamma_2$ corresponding to FIG. 5a, which range between 15° and 45°, preferably 20° to 35°. The angles $\gamma_1$ and $\gamma_2$ can be identical or different. The longitudinal axis 14 forms with the cutting edge 12 an angle $\alpha_4$, which ranges between 30° and 120°, preferably between 60° and 120°. The angle of the longitudinal axis 14 is determined essentially by the chip removal direction 31 (see FIG. 1b).

As can be seen in FIGS. 1a, b and FIG. 2, if there are several longitudinal ribs, preferably arranged parallel to each other along the cutting edge 12, then the distance between them equals b3, which is measured between respectively neighboring end points of the respective maximum 21. This distance is 1.5 to 5 times, preferably up to 3 times greater than the aforedescribed value b2.

The ascending slope 20 reaches at least partially into the area defined by the chamfer 17, preferably in such a manner that the lateral flanks 25 adjoining the ascending slope 20 end rearward with the chamfer 17. The longitudinal ribs 13, or their longitudinal axis 14, are arranged at a right angle or an acute angle with respect to the cutting edge. However the extension of the longitudinal axis 14 can also be oriented towards the apex of the cutting corner 11.

In FIG. 1b a cutting insert is shown in process of the machining a workpiece 32. The arrow 33 shows the advance direction of the cutting insert in relation to the workpiece 32, which is being machined with a maximal cutting depth. In the area of this cutting depth a, along the cutting edge 12 at least one longitudinal rib 13 is provided, whose longitudinal axis 14 is oriented in the chip removal direction 31, i.e. parallel thereto. The removed chip is formed in the immediate vicinity of the cutting edge by the ascending slope 20, but the cutting insert is noticeably relieved by the narrowing upper surface 22. force required for deflecting the chip is relatively small, and the longitudinal ribs remain resistant to wear even during roughing-down operations and friction due to the nature of the material.

Figure 4A:
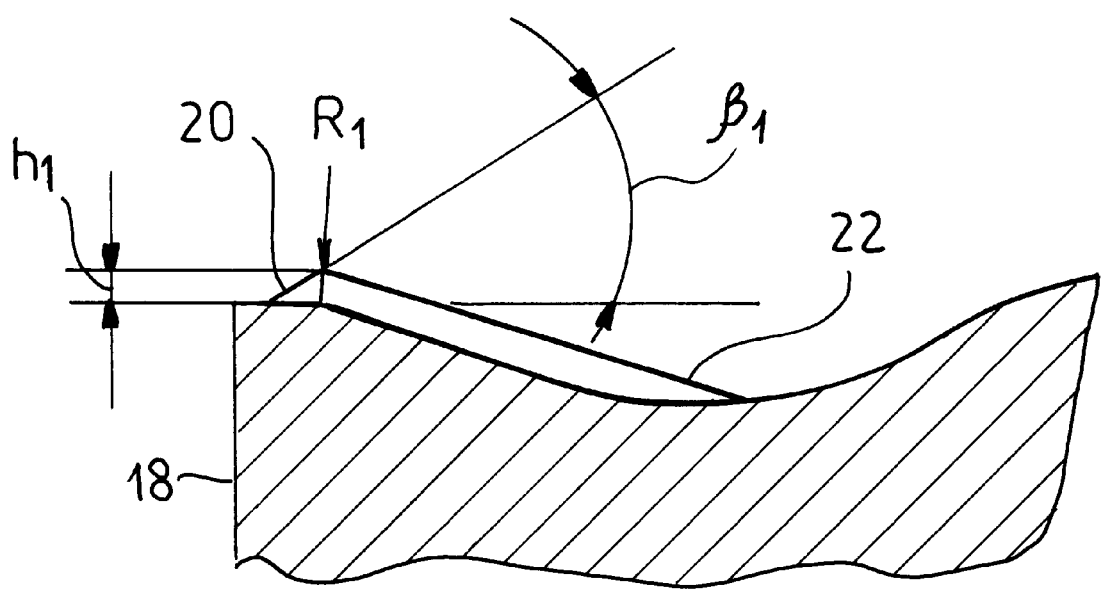
FIGS. 4a and 4b are respective sectional views taken along lines A—A and B—B of FIG. 1a FIGS. 5a, 5b, 5c and 5d are sectional views along a line C—C of FIG. 1a showing various embodiments.
Figure 4B:
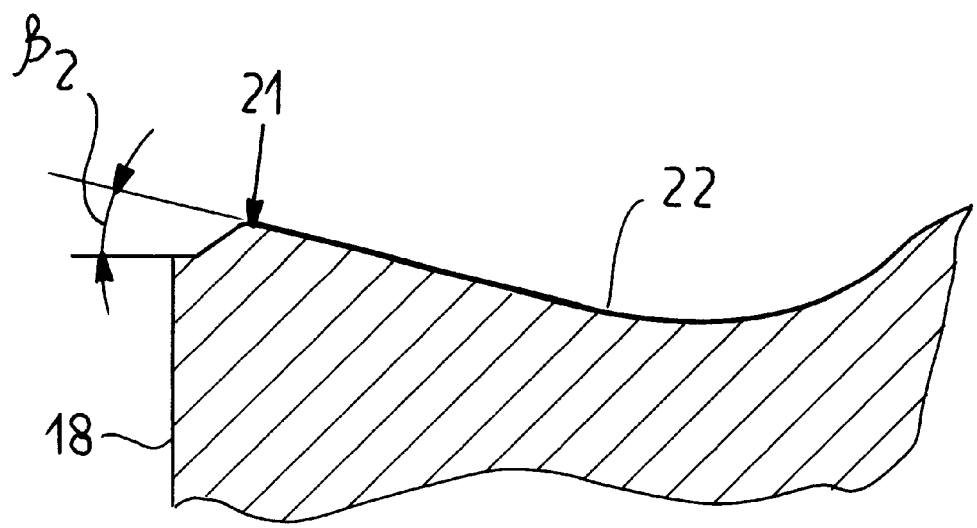
Figure 5A:
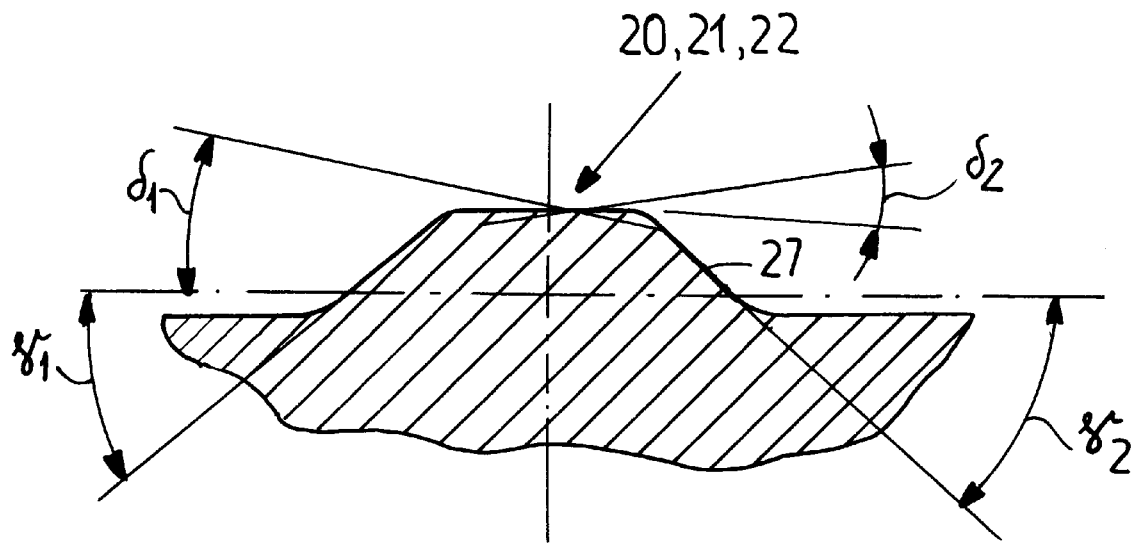
Figure 5B:
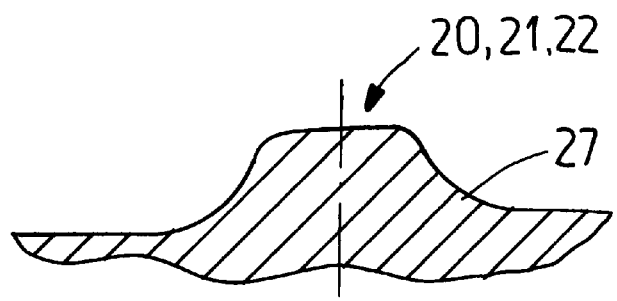
Figure 5C:
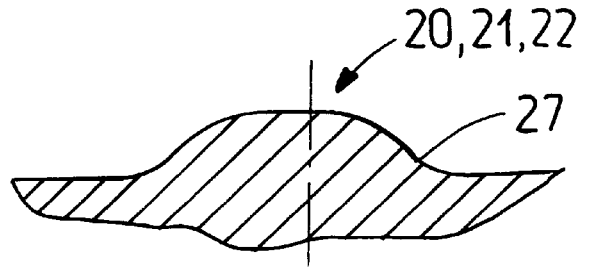
Figure 5D:
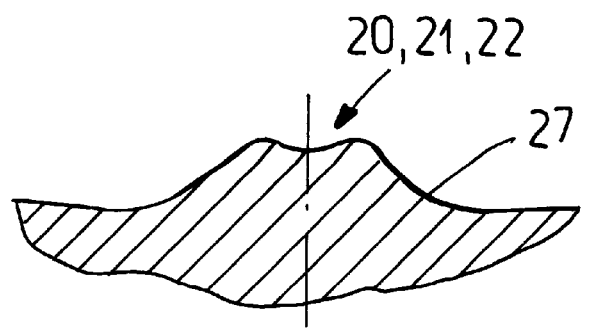

The sectional views according to FIGS. 4a and 4b show that the longitudinal rib profile has a roof-like configuration. The angle $\beta_1$ of the ascending slope 20 lies between 10° and 45°, preferably between 20° and 30°, while the angle $\beta_2$ formed by the upper surface 22 with the cutting edge plane ranges between 5° and 40°, preferably 5° and 15°. The angle $\beta_2$ can be parallel to the effective cutting angle. The end of the ascending slope forms the maximum 21, whereby the respective edge can also be rounded with an edge radius between 0.1 mm and 1 mm, preferably 0.25 mm and 0.5 mm. In relation to the cutting edge 12 the maximum 21 lies at a distance $h_1$ between 0.05 mm and 0.5 mm, preferably 0.1 mm and 0.3 mm.

FIGS. 5a to 5d show cross sectional views along sections perpendicular to the rib axis in the area of the descending upper surface 22. However a corresponding situation is valid for the area of the ascending slope 20 and the maximum 21. The upper surface 22 can be flat or also concave (see FIG. 5d) and parallel or also set at positive angles $\Delta_1$ or negative angles $\Delta_2$. The lateral flanks 27 are flat (FIG. 5a), concave (FIG. 5b) or also convex (FIG. 5c), respectively set at the already described angles $\gamma_1$ and $\gamma_2$. In the case of concave or convex flanks the inclination angle $\gamma$ is defined by the border surface 30 and the upper edge 24, respectively the edges 29 and 26.

FIGS. 6a to 6e show various designs of faces and longitudinal rib profiles. The face can be designed without a chamfer (FIG. 6a), with a 0° chamfer (FIG. 6b) or a negative chamfer (FIG. 6c). In the area of the upper surface 22 the longitudinal rib profile is flat, concave (FIG. 6d) or convex (FIG. 6e), each seen in the direction of longitudinal axis 14. The face surface surrounding the longitudinal ribs 13, optionally adjoining a chamfer 17, slopes downwardly towards the rear, particularly by passed into a chip-forming recess 34.

Figure 7A:
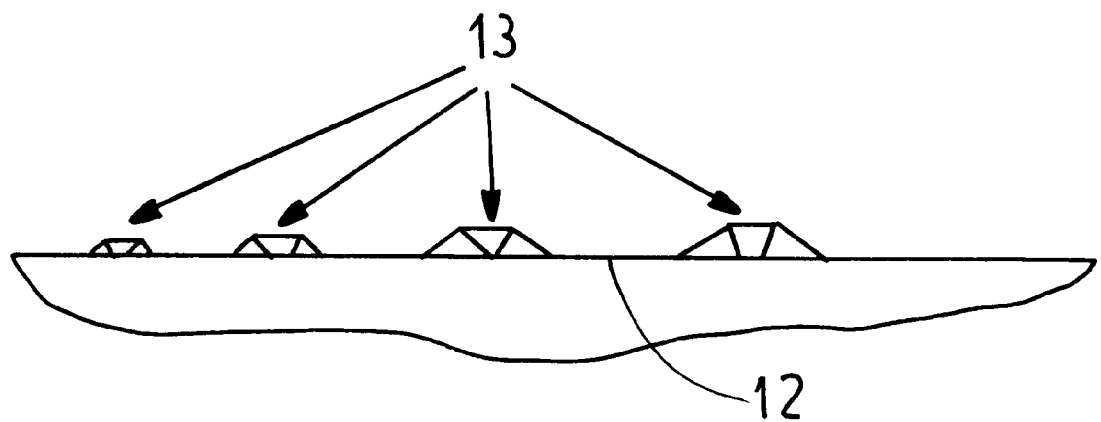
FIGS. 7a and 7b are detail frontal views of cutting inserts of the invention in various embodiments.
Figure 7B:
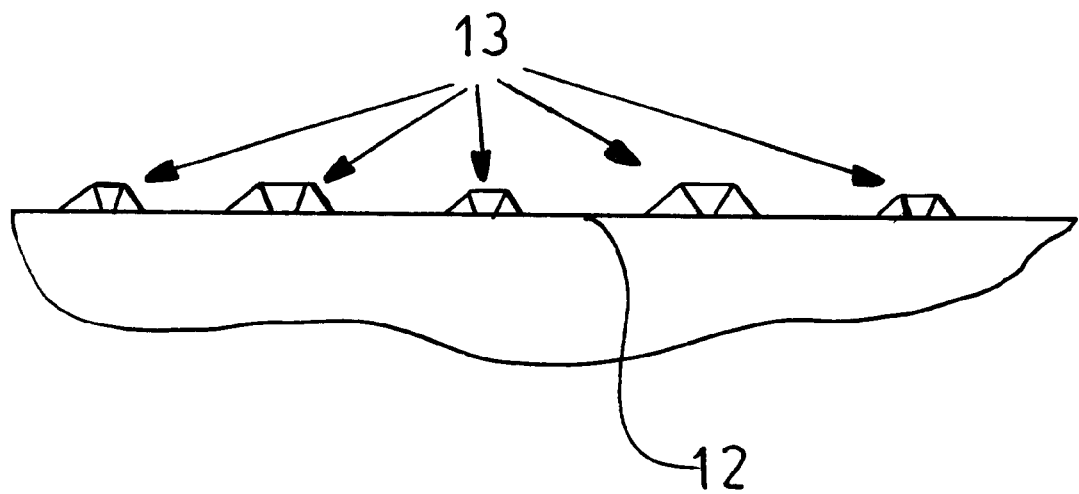

Considered from the cutting corner 11 towards the cutting edge 12, the rib height $h_1$ can increase or decrease or be designed alternatingly, as can be seen in FIGS. 7a and 7b. In the spirit of the present invention, when on the face of a cutting insert 10 several longitudinal ribs 13 are arranged, all angle sizes $\alpha_1$ to $\alpha_4$, $\beta_1$, $\beta_2$, $\gamma_1$, $\gamma_2$, $\Delta_1$ and $\Delta_2$, as well as the length $a_1$ to $a_3$ and the widths $b_1$ and $b_2$ can be varied within the above-described limits. The same applies to the distances $b_3$ between the longitudinal ribs.

Figure 8A:
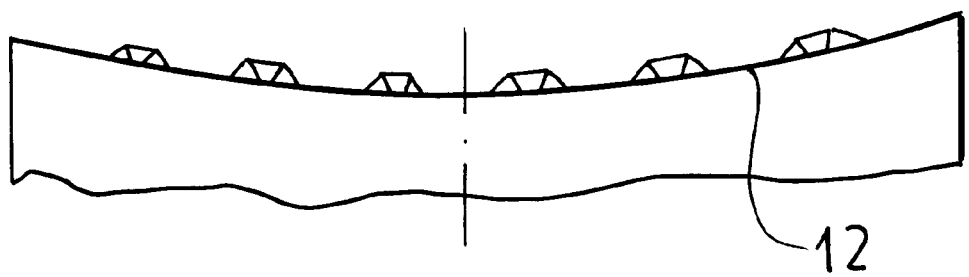
FIGS. 8a, 8b and 8c are front views of other cutting edge shapes.
Figure 8B:
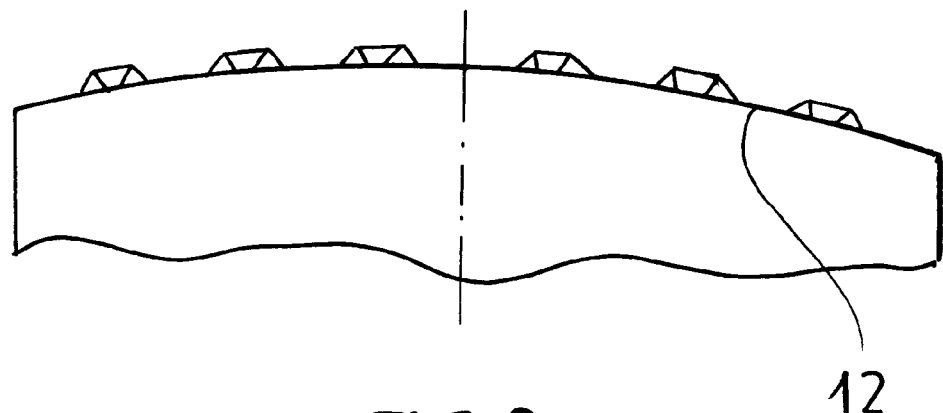
Figure 8C:
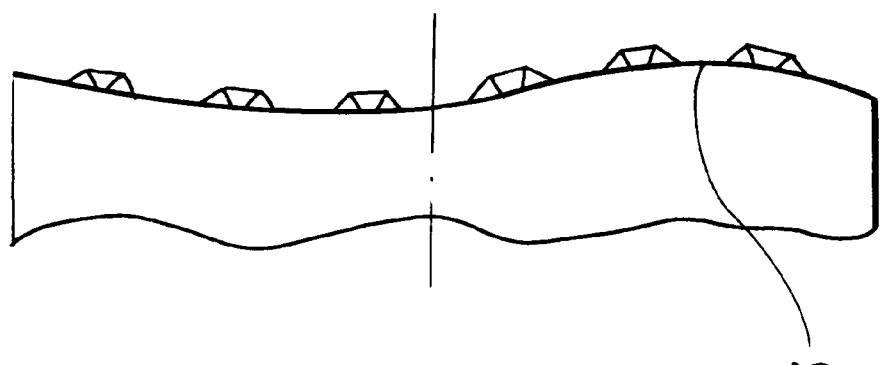

In relation to the corner 11 the cutting edge 12 can have a positive angle of inclination (FIG. 8a), a negative angle of inclination (FIG. 8b) or also a sinuous shape (FIG. 8c). Thereby result corresponding convex, concave or alternating cutting edge configurations.

Figure 9A:
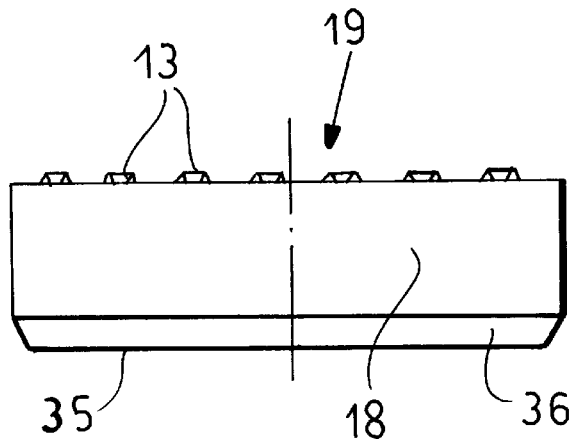
FIGS. 9a, 9b and 9c are side views of various cutting inserts according to the present invention.
Figure 9B:
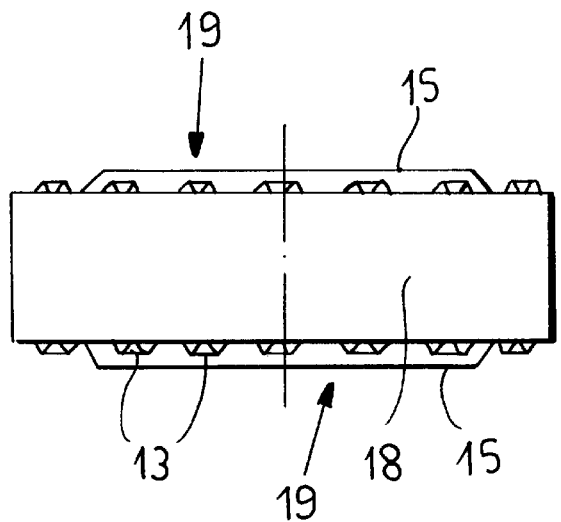
Figure 9C:
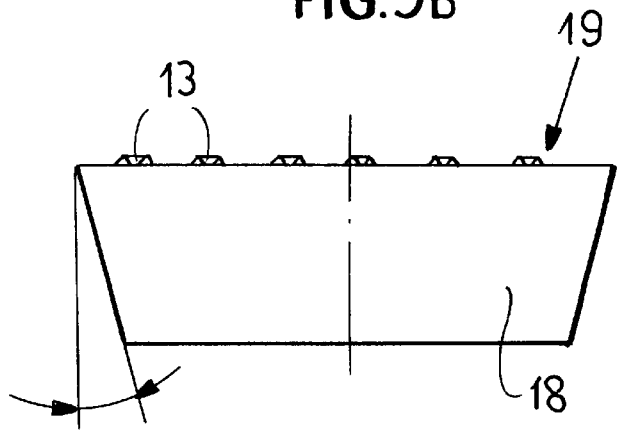

When the cutting insert 10 is designed as a one-sided cutting insert corresponding to FIG. 9, i.e. with only one face 19 opposite to a contact surface 35, the cutting insert can have in addition a protection chamfer 36 against chip impact in the area bordering on the bottom surface 25. When a cutting insert is designed for two-sided use according to FIG. 9, median plateaus 15 are provided at the upper and lower faces, which surpass the cutting elements, particularly the longitudinal ribs 13. FIG. 9c shows a cutting insert with a positive free flank 18.

Figure 10:
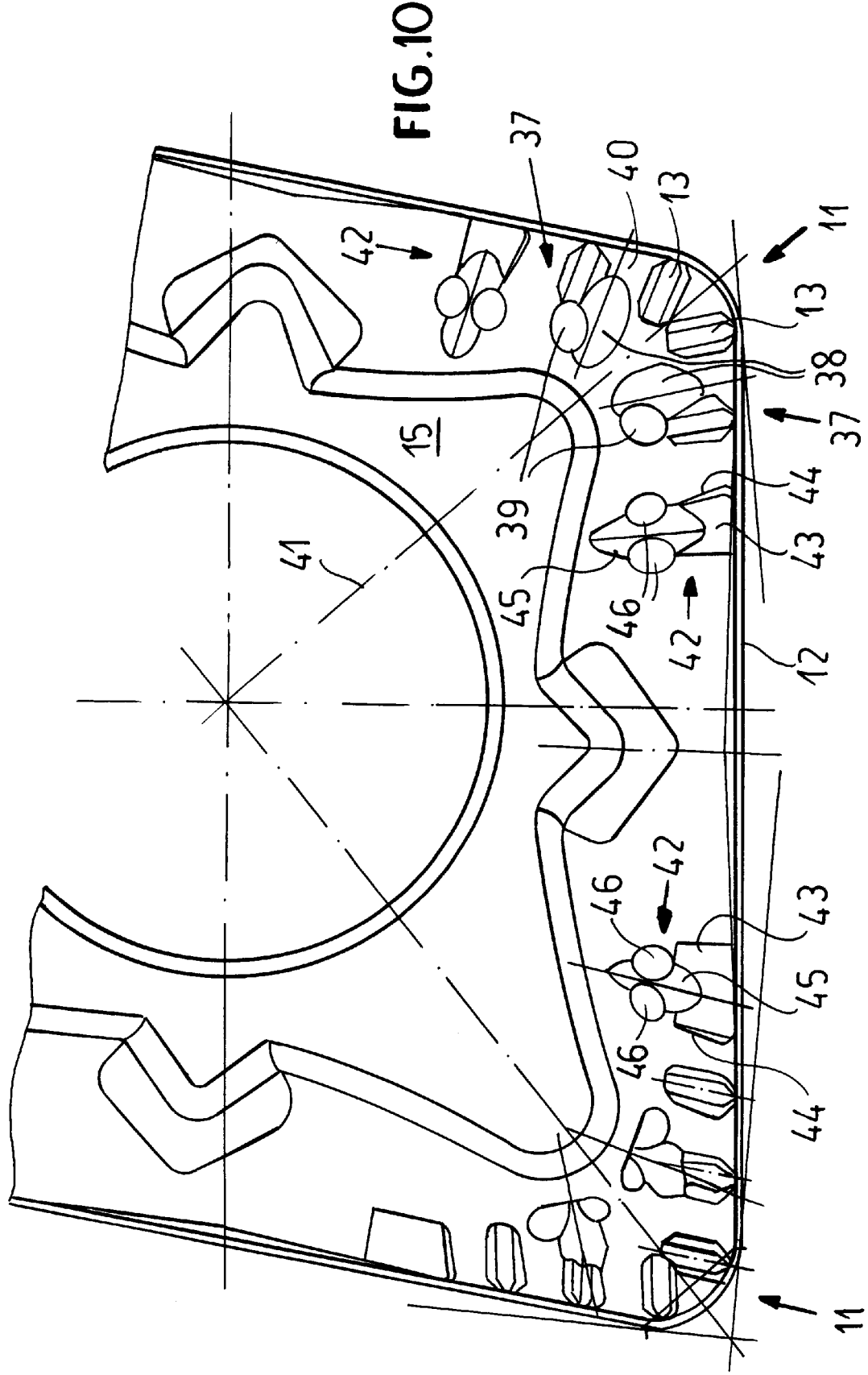
FIG. 10 is a fragmentary top view of a cutting insert with the longitudinal ribs of the invention and further cutting elements.

In the embodiment of the cutting insert according to FIG. 10, the face has various cutting elements, i.e. in addition to the already described longitudinal ribs 13 there are also further cutting elements. In the present case in the area of each cutting edge two longitudinal ribs 13 are provided, whose longitudinal axes, respectively longitudinal axis extensions intersect with the cutting edge 11 which is tapering off. Longitudinal ribs 37 are provided to either side of the array of ribs 13 at each corner. The longitudinal ribs 37 have frontal areas designed correspondingly to the aforedescribed longitudinal ribs 13. However in the areas remote from the cutting edge further projections 38 and 39 are provided, whereby the projection 38 also represents essentially a longitudinal rib, but differently from the longitudinal ribs of the invention it has a rounded upper edge. The side facing away from the cutting edge is adjoined by a partially spherical element 39, as an element lying transversely to the longitudinal axis 40 of the projection 38.

The cutting elements 37 to 39 are arranged in a symmetrical mirror-image fashion in relation to the bisectrix of the cutting corner 41.

In the more remote areas with respect to the cutting edge also a further rib-shaped element 42 is provided with an upper surface 43, which runs transversely with respect to the cutting edge plane, and tapers off into the face area, so that a flank 41 is provided only on one side, i.e. on the side facing the cutting corner bisectrix 41. This rib 42 to 44 represents a modification of the rib 13 of the invention, in that it has an ascending slope and an upper surface set at such an acute angle that it serves approximately only as a half rib. In an area more remote with respect to the cutting edge there is an adjoining parabolic rib 45, which has on both sides partially spherical projections 46.

Further the cutting insert shown in FIG. 10 has a median plateau 15, which in the area of the cutting edge median has projecting parts 47 serving for a better support of the plateau when positioned in a tool holder. This cutting insert is designed as an indexable insert with opposite faces.

We claim:

1. A cutting insert comprising:

a polygonal cutting insert body formed with at least one cutting corner, a top side, and a front side adjoining said corner and forming a cutting edge with said top side; and at least one cutting element in the form of an elongated rib formed on said top side of said body and having a longitudinal axis extending substantially in a chip-removal direction, said rib having a front end spaced from said cutting edge and a cross section increasing from said front end to a region at which said cross section is a maximum and decreasing from said maximum to a rear end of said rib, said rib having:

an ascending front flank rising from said front end and widening toward a greatest width as said region, a descending upper surface directly adjoining said ascending front flank at said region and narrowing away therefrom to said rear end, and a height of said region such that said region lies above said cutting edge.

2. The cutting insert defined in claim 1 wherein said longitudinal axis includes an angle ($\alpha_4$) between 30° and 150° with said cutting edge.

3. The cutting insert defined in claim 1 wherein said rib has a pair of lateral flanks adjoining said upper surface at respective lateral edges of said upper surface, said lateral edges being inclined to said longitudinal axis at angles ($\alpha_1$, $\alpha_2$) between 3° to 20°.

4. The cutting insert defined in claim 1 wherein said ascending front flank has an initial width at said front end between 0.0 mm and 0.5 mm and increases to said greatest width which is between 0.3 mm to 1.5 mm and 2 to 4 times said initial width.

5. The cutting insert defined in claim 1 wherein said front end of rib is spaced between 0.03 mm and 1 mm from the cutting edge.

6. The cutting insert defined in claim 1 wherein said rib has a length between 1.0 mm and 8.0 mm and said ascending front flank has a length between 0.3 mm and 1.5 mm.

7. The cutting insert defined in claim 1 wherein said ascending front flank is flat and has an angle with said top side adjacent said cutting edge range between 10° and 45°.

8. The cutting insert defined in claim 1 wherein said ascending front flank is curved and a tangent to said ascending front flank includes an angle with said top side adjacent said cutting edge between 10° and 45°.

9. The cutting insert defined in claim 1 wherein said longitudinal rib is convex in said region with a radius ($R_1$) between 0.1 mm and 1 mm.

10. The cutting insert defined in claim 1 wherein said upper surface is curved.

11. The cutting insert defined in claim 1 wherein a plurality of said cutting elements are formed to each side of said corner at a spacing between said ribs measured at said region between 1.5 and 5 times the width at said greatest width of said ribs.

12. The cutting insert defined in claim 1 wherein said elongated rib has lateral flanks adjoining said ascending front flank and said upper surface with angles of inclination ranging between 15° and 45° relative to respective base lines.

13. The cutting insert defined in claim 1 wherein said ascending front flank and said upper surface lie parallel to said cutting edge transversely of said axis.

14. The cutting insert defined in claim 1 wherein said ascending slope and said upper surface include angles of up to 15° transversely of said rib relative to a line parallel to said cutting edge.

15. The cutting insert defined in claim 1, further comprising a chamfer on said body at said cutting edge, said rib extending into said chamfer.

16. The cutting insert defined in claim 1 wherein said region lies above said cutting edge by a height between 0.05 and 0.5 mm.

17. The cutting insert defined in claim 1 wherein a plurality of said cutting elements are provided on each side of said corner and the elongated ribs of said elements vary from one another with respect to angular orientation, shape and height.

18. The cutting insert defined in claim 1 wherein said front side is perpendicular to said top side.

19. The cutting insert defined in claim 1 wherein said front side forms a positive angle with said top side.

20. The cutting insert defined in claim 1 wherein said cutting edge is a straight edge.

21. The cutting insert defined in claim 1, further comprising additional raised cutting elements on said top side.

22. The cutting insert defined in claim 1 wherein said top side is formed with a recess extending to said cutting edge.

23. A cutting insert comprising:

a polygonal cutting insert body formed with at least one cutting corner, a top side, and a front side adjoining said corner and forming a cutting edge with said top side; and at least one cutting element in the form of an elongated rib formed on said top side of said body and having a longitudinal axis extending substantially in a chip-removal direction, said rib having a front end spaced from said cutting edge and a cross section increasing from said front end to a region at which said cross section is a maximum and decreasing from said maximum to a rear end of said rib, said rib having:

an ascending front flank rising from said front end and widening toward a greatest width as said region, a descending upper surface directly adjoining at said region and narrowing away therefrom to said rear end, a height of said region such that said region lies above said cutting edge, and said upper surface includes an angle ($\beta_2$) with said top side adjacent said cutting edge between 5° and 40°.

24. The cutting insert defined in claim 23 wherein said longitudinal axis includes an angle ($\alpha_4$) between 60° and 120° with said cutting edge, said rib is formed with lateral flanks adjoining said upper surface in respective lateral edges, said lateral edges including angles ($\alpha_1$, $\alpha_2$) between 5° and 15°, said ascending front flank having an initial width ($\beta 1$) at said front end between 0.2 mm and 0.3 mm, said greatest width being 2 to 4 times said initial width, said front end being spaced 0.05 mm to 0.3 mm from said cutting edge, said rib having a length ($\alpha_2$) between 1.4 mm and 4 mm, said ascending front flank having a length ($\alpha_3$) between 0.4 mm and 0.8 mm, said ascending front flank forming an angle with said top side adjacent said cutting edge between 20° and 30°, said angle ($\beta_2$) included between said upper surface and said top side being 5° to 15°, said region projecting above said cutting edge by 0.1 mm to 0.3 mm.

* * * * *